US009776627B2

United States Patent
Tojo et al.

(10) Patent No.: US 9,776,627 B2
(45) Date of Patent: Oct. 3, 2017

(54) HYBRID VEHICLE DRIVING DEVICE

(71) Applicant: AISIN SEIKI KABUSHIKI KAISHA, Kariya-shi (JP)

(72) Inventors: Takeshi Tojo, Chiryu (JP); Takahiro Misu, Nagoya (JP); Shota Hirose, Kariya (JP); Shinya Harada, Adachi-ku (JP); Tomoyuki Toyama, Chita (JP); Yoshiyuki Komi, Hamamatsu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/269,344

(22) Filed: Sep. 19, 2016

(65) Prior Publication Data
US 2017/0088121 A1   Mar. 30, 2017

(30) Foreign Application Priority Data

Sep. 30, 2015 (JP) ................................. 2015-193800

(51) Int. Cl.
*B60K 6/383* (2007.10)
*B60W 10/06* (2006.01)
(Continued)

(52) U.S. Cl.
CPC ............... *B60W 20/20* (2013.01); *B60K 6/26* (2013.01); *B60K 6/383* (2013.01); *B60K 6/387* (2013.01);
(Continued)

(58) Field of Classification Search
None
See application file for complete search history.

(56) References Cited

U.S. PATENT DOCUMENTS 5,433,282 A * 7/1995 Moroto ............... B60K 6/365
178/65.21
5,558,173 A * 9/1996 Sherman ............... B60W 20/40
180/53.8

(Continued)

FOREIGN PATENT DOCUMENTS

JP         2012-176730         9/2012

OTHER PUBLICATIONS

Extended European Search Report dated Feb. 28, 2017 in Patent Application No. 16189073.6.

*Primary Examiner* — Justin Holmes
(74) *Attorney, Agent, or Firm* — Oblon, McClelland, Maier & Neustadt, L.L.P.

(57) ABSTRACT

A hybrid vehicle driving device includes: a first motor generator; a second motor generator; an input shaft; an output shaft; a rotating member rotatably linked to the output shaft; a connection member to which the first motor generator is connected; a connection mechanism which connects and disconnects the connection member and the rotating member; a one-way clutch connecting the input shaft and the connection member; a synchronization control portion synchronizing the rotational speed of the first motor generator with the rotational speed of the rotating member; a first engine control portion maintaining the rotational speed of an engine; a connection portion connecting the connection member and the rotating member to each other; and a second engine control portion controlling the engine such that the rotational speed of the input shaft is synchronized with the rotational speed of the connection member.

5 Claims, 3 Drawing Sheets

(51) Int. Cl.
| | |
|---|---|
| *B60W 20/20* | (2016.01) |
| *B60K 6/26* | (2007.10) |
| *B60K 6/442* | (2007.10) |
| *B60W 10/02* | (2006.01) |
| *B60W 10/08* | (2006.01) |
| *B60K 6/387* | (2007.10) |
| *B60W 20/40* | (2016.01) |

(52) U.S. Cl.
CPC .............. *B60K 6/442* (2013.01); *B60W 10/02* (2013.01); *B60W 10/06* (2013.01); *B60W 10/08* (2013.01); *B60W 20/40* (2013.01); *B60K 2006/266* (2013.01); *B60W 2510/0241* (2013.01); *B60W 2710/021* (2013.01); *B60W 2710/0644* (2013.01); *B60W 2710/081* (2013.01); *B60W 2710/1011* (2013.01); *B60Y 2200/92* (2013.01); *B60Y 2300/19* (2013.01); *B60Y 2400/427* (2013.01); *Y10S 903/913* (2013.01); *Y10S 903/93* (2013.01)

(56) References Cited

U.S. PATENT DOCUMENTS

| | | | |
|---|---|---|---|
| 2012/0053011 A1* | 3/2012 | Onomura | B60K 6/383 477/3 |
| 2012/0058858 A1* | 3/2012 | Ichikawa | B60K 6/543 477/5 |
| 2013/0109523 A1* | 5/2013 | Shibata | B60K 6/445 475/5 |
| 2014/0083246 A1 | 3/2014 | Venturi | |
| 2015/0176694 A1* | 6/2015 | Iwase | B60K 6/383 475/331 |
| 2015/0202953 A1* | 7/2015 | Iwase | B60K 6/383 475/5 |

* cited by examiner

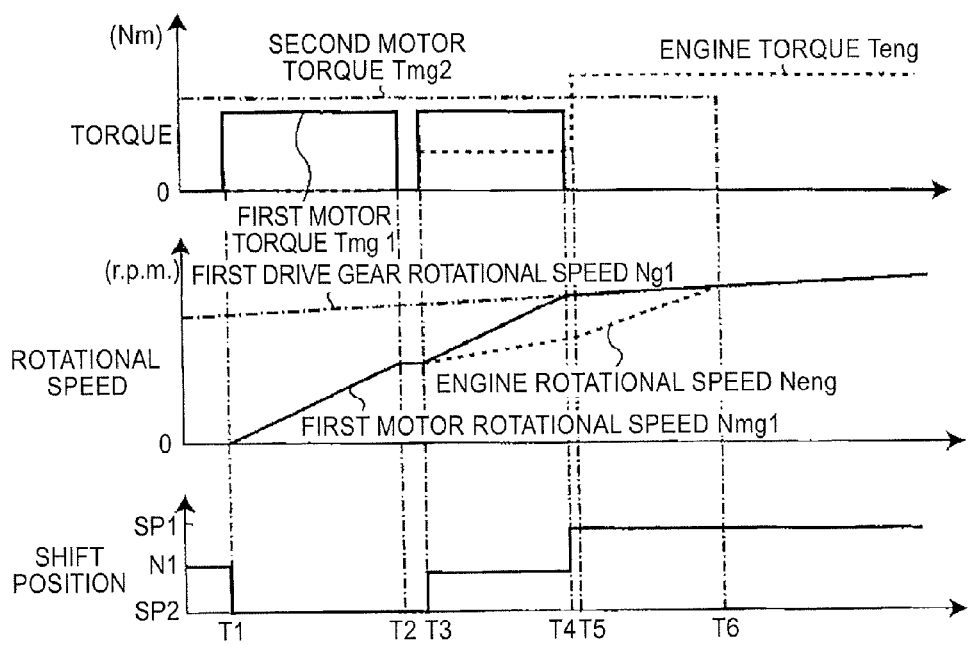

HYBRID VEHICLE DRIVING DEVICE

CROSS REFERENCE TO RELATED APPLICATIONS

This application is based on and claims priority under 35 U.S.C. §119 to Japanese Patent Application 2015-193800, filed on Sep. 30, 2015, the entire contents of which are incorporated herein by reference.

TECHNICAL FIELD

This disclosure relates to a hybrid vehicle driving device.

BACKGROUND DISCUSSION

From the related art, as described in JP 2012-176730A (Reference 1), a hybrid vehicle driving device provided with two motor generators and an engine, has been suggested. The hybrid vehicle driving device includes a first clutch for connecting and disconnecting the engine and an output shaft to and from each other, and a second clutch for connecting and disconnecting the first motor generator and the output shaft to and from each other.

In the hybrid vehicle driving device described in Reference 1, when the engine torque output by the engine is transmitted to the output shaft, the first clutch which is in a disconnected state is connected. At this time, there is a difference in the rotational speed between members connected by the first clutch, the power is transmitted by the connection of the first clutch, an inertial force of the engine is input to a member, such as a gear that changes the speed of the hybrid vehicle driving device via the first clutch, an excessive force acts on the member, and thus, it is necessary to take certain countermeasures against this.

SUMMARY

Thus, a need exists for a hybrid vehicle driving device which is not suspectable to the drawback mentioned above.

A hybrid vehicle driving device according to an aspect of this disclosure includes: a first motor generator; a second motor generator; an input shaft to which an engine is rotatably linked; an output shaft to which a driving wheel and the second motor generator are rotatably linked; a rotating member which is rotatably linked to the output shaft; a connection member to which the first motor generator is connected; a connection mechanism which connects and disconnects the connection member and the rotating member to and from each other; a one-way clutch which connects the input shaft and the connection member to each other in a case where the rotational speed of the input shaft is higher than the rotational speed of the connection member, and disconnects the input shaft and the connection member from each other in a case where the rotational speed of the input shaft is lower than the rotational speed of the connection member; a synchronization control portion which synchronizes the rotational speed of the first motor generator with the rotational speed of the rotating member in the middle of executing the engine connection control that connects the engine to the rotating member by the one-way clutch after connecting the connection member and the rotating member to each other by the connection mechanism; a first engine control portion which maintains the rotational speed of the engine to be a rotational speed lower than the rotational speed of the first motor generator while synchronizing the rotational speed of the first motor generator with the rotational speed of the rotating member by the synchronization control portion in the middle of executing the engine connection control; a connection portion which connects the connection member and the rotating member to each other by the connection mechanism after synchronizing the rotational speed of the first motor generator with the rotational speed of the rotating member by the synchronization control portion in the middle of executing the engine connection control; and a second engine control portion which controls the engine such that the rotational speed of the input shaft is synchronized with the rotational speed of the connection member after connecting the connection member and the rotating member to each other by the connection portion in the middle of executing the engine connection control.

BRIEF DESCRIPTION OF THE DRAWINGS

The foregoing and additional features and characteristics of this disclosure will become more apparent from the following detailed description considered with the reference to the accompanying drawings, wherein:

FIG. 2 is an engagement table of the hybrid vehicle driving device;

FIG. 3 is a time chart of engine connection control; and

DETAILED DESCRIPTION

Description of Vehicle

Figure 1:
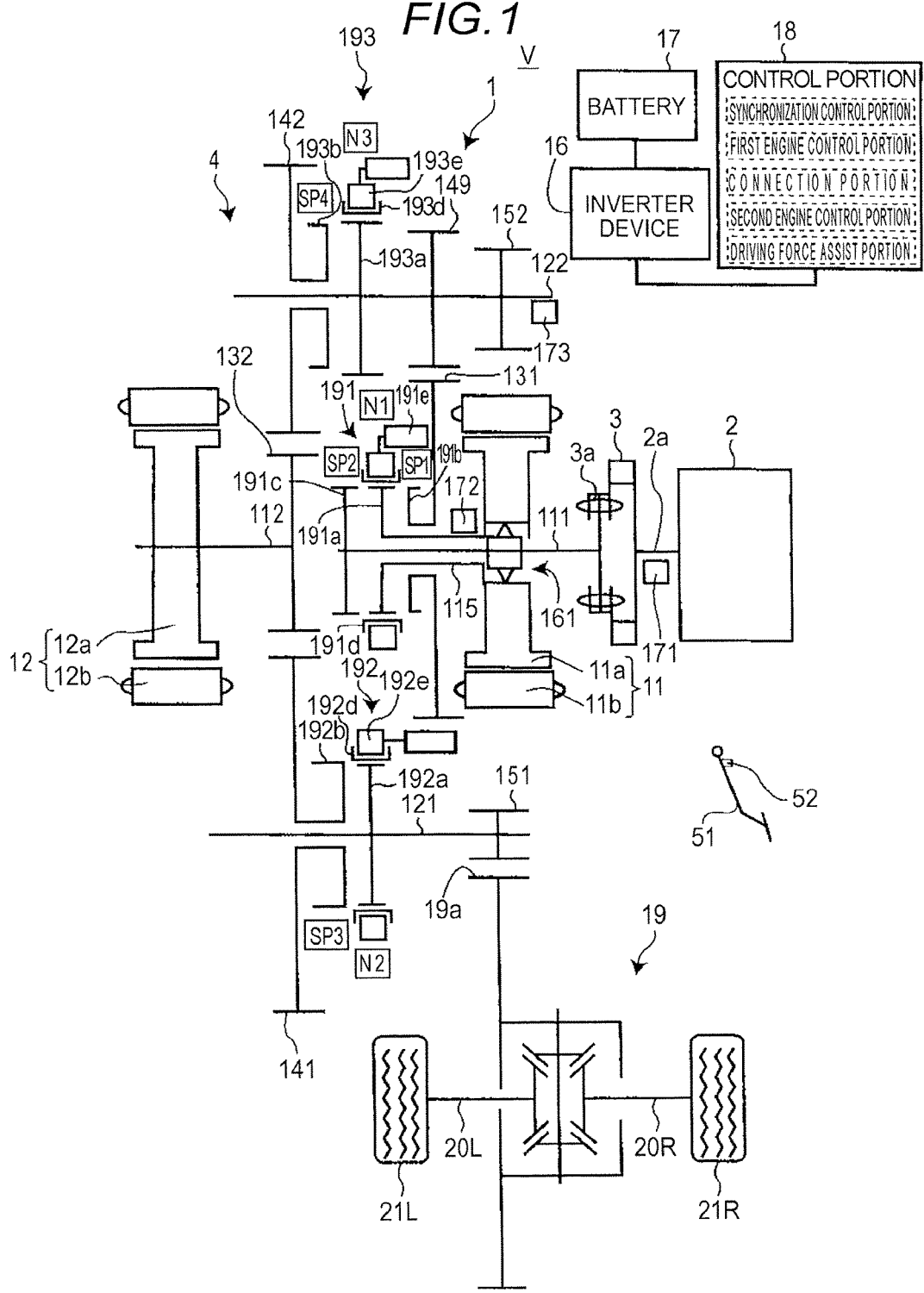
FIG. 1 is a view illustrating a vehicle on which a hybrid vehicle driving device is mounted.

Based on FIG. 1, a vehicle V on which a hybrid vehicle driving device 1 according to an embodiment disclosed here is mounted, will be described. As illustrated in FIG. 1, the vehicle V includes the hybrid vehicle driving device 1, a differential 19, drive shafts 20L and 20R, driving wheels 21L and 21R, an accelerator pedal 51, and an accelerator sensor 52. The hybrid vehicle driving device 1 includes an engine 2, a fly wheel 3, an automatic transmission 4, a first motor generator 11, a second motor generator 12, an inverter device 16, a battery 17, a control portion 18, an engine rotational speed sensor 171, a first motor rotational speed sensor 172, and an output shaft rotational speed sensor 173.

The engine 2 uses hydrocarbon-based fuel, such as gasoline or diesel, and is a gasoline engine or a diesel engine which outputs the engine torque Teng to a driving shaft 2a. The fly wheel 3 is linked to the driving shaft 2a. In the fly wheel 3, a damper 3a which absorbs the change in the input engine torque Teng, is provided. A configuration of the automatic transmission 4 will be described in detail later.

The motor generators 11 and 12 are configured of rotors 11a and 12a, and stators 11b and 12b. The rotors 11a and 12a are provided to be rotatable on the inner circumferential side of the stators 11b and 12b. The battery 17 is a secondary cell that accumulates the electric power, and supplies electric power to the stators 11b and 12b of the motor generators 11 and 12 via the inverter device 16.

Based on a command from the control portion 18, the inverter device 16 increases voltage of the electric power supplied from the battery 17, supplies the electric power to the stators 11b and 12b of the motor generators 11 and 12, and drives the motor generators 11 and 12. In addition, based on the command from the control portion 18, the inverter device 16 decreases the voltage of the electric power generated in the motor generators 11 and 12, and charges the electric power to the battery 17. In a case where a brake pedal (not illustrated) is stepped, the control portion 18 outputs the command to the inverter device 16, generates the electric power in at least one of the first motor generator 11 and the second motor generator 12, and generates a regenerative braking force.

The differential 19 transmits the torque output from the automatic transmission 4 to the left and right driving wheels 21L and 21R via the left and right drive shafts 20L and 20R, and absorbs the difference in the rotational speed of the left and right driving wheels 21L and 21R.

The accelerator pedal 51 is provided to be oscillatable in a driver's seat of the vehicle V. The accelerator sensor 52 detects an accelerator stroke Sta which is an operation amount of the accelerator pedal 51, and outputs the detection result to the control portion 18.

The control portion 18 calculates the necessary torque Trd of a driver based on the accelerator stroke Sta detected by the accelerator sensor 52.

Automatic Transmission

Hereinafter, the automatic transmission 4 will be described. The automatic transmission 4 includes a first input shaft 111, a second input shaft 112, a tubular member 115, a first output shaft 121, a second output shaft 122, a first drive gear 131, a second drive gear 132, a first driven gear 141, a second driven gear 142, an overdrive driven gear 149, a first output gear 151, a second output gear 152, a one-way clutch 161, a first connection mechanism 191, a second connection mechanism 192, and a third connection mechanism 193.

The first input shaft 111 is provided coaxially to the driving shaft 2a and in series with the driving shaft 2a. The first input shaft 111 is rotatably linked to the driving shaft 2a of the engine 2 via the fly wheel 3. The tubular member 115 (connection member) has a cylinder shape, and is provided on the outer circumferential side of the first input shaft 111 and coaxially to the first input shaft 111. The second input shaft 112 is provided coaxially to the first input shaft 111 and in series with the first input shaft 111. The first output shaft 121 and the second output shaft 122 are provided in parallel to the first input shaft 111 and the second input shaft 112 in the radial direction.

The rotor 11a of the first motor generator 11 is rotatably linked to the tubular member 115. According to the configuration, the rotor 11a is provided to be rotatable around the shaft line of the tubular member 115. The one-way clutch 161 is provided between the first input shaft 111 and the tubular member 115. In a case where the rotational speed of the first input shaft 111, that is, the rotational speed of the engine 2 is higher than the rotational speed of the tubular member 115, that is, the rotational speed of the rotor 11a, the one-way clutch 161 is placed in a locked state, the first input shaft 111 and the tubular member 115 (connection member) are connected to each other, and the driving shaft 2a of the engine 2 is rotatably linked to the rotor 11a of the first motor generator 11. Meanwhile, in a case where the rotational speed of the first input shaft 111 is lower than the rotational speed of the tubular member 115, the one-way clutch 161 is placed in a free state, and the first input shaft 111 and the tubular member 115 are disconnected from each other. The first drive gear 131 (rotating member) is provided to be turnable (rotatable) around the shaft line of the tubular member 115.

The second drive gear 132 and the rotor 12a of the second motor generator 12 are fixed to the second input shaft 112. The first output gear 151 is fixed to the first output shaft 121, and meshes with a ring gear 19a of the differential 19. According to the configuration, the first output shaft 121 is rotatably linked to the driving wheels 21L and 21R. The first driven gear 141 is provided to be turnable around the first output shaft 121, and meshes with the second drive gear 132. According to the configuration, as will be described later, when the first driven gear 141 is connected to the first output shaft 121, the second motor generator 12 is rotatably linked to the first output shaft 121.

The overdrive driven gear 149 is fixed to the second output shaft 122, and meshes with the first drive gear 131. According to the configuration, the first drive gear 131 (rotating member) is rotatably linked to the second output shaft 122.

The second output gear 152 is fixed to the second output shaft 122, and meshes with the ring gear 19a of the differential 19. According to the configuration, the second output shaft 122 is rotatably linked to the driving wheels 21L and 21R. The gear diameter (pitch circle diameter, reference circle diameter) of the second output gear 152 becomes greater than the gear diameter of the first output gear 151.

The second driven gear 142 is provided to be turnable around the second output shaft 122, and meshes with the second drive gear 132. According to the configuration, as will be described later, when the second driven gear 142 is connected to the second output shaft 122, the second motor generator 12 is rotatably linked to the second output shaft 122. The gear diameter of the second driven gear 142 becomes smaller than the gear diameter of the first driven gear 141.

The first connection mechanism 191 is a dog clutch which is converted to any of a first shift position SP1 which connects the first drive gear 131 to the tubular member 115, a second shift position SP2 which connects the first input shaft 111 to the tubular member 115, and a first neutral N1 in which one of the first drive gear 131 and the first input shaft 111 is not connected to the tubular member 115. In other words, the first connection mechanism 191 connects and disconnects the first drive gear 131 or the first input shaft 111 and the tubular member 115 to and from each other. The first connection mechanism 191 is configured of a first hub 191a, a first engaging member 191b, a second engaging member 191c, a first sleeve 191d, and a first actuator 191e.

The first hub 191a is fixed to the tubular member 115. The first engaging member 191b is provided to be fixed to the first drive gear 131 and to be adjacent to the first hub 191a. The second engaging member 191c is provided to be fixed to the first input shaft 111 and to be adjacent to the first hub 191a. The first sleeve 191d is spline-fitted to the first hub 191a, is selectively engaged with one of the first engaging member 191b and the second engaging member 191c, and is not engaged with both of the first engaging member 191b and the second engaging member 191c.

Based on the command from the control portion 18, the first actuator 191e moves the first sleeve 191d to any of the first neutral N1, the first shift position SP1, and the second shift position SP2. In a state where the first sleeve 191d is positioned in the first neutral N1, the first hub 191a is not engaged with one of the first engaging member 191b and the second engaging member 191c, and the rotor 11a (tubular member 115) of the first motor generator 11 and the first input shaft 111 are disconnected from the first drive gear 131. In a state where the first sleeve 191d is positioned in the first shift position SP1, the first hub 191a is engaged with the first engaging member 191b, the first drive gear 131 is connected to the tubular member 115, and the rotor 11a of the first motor generator 11 is connected to the first drive gear 131. In a state where the first sleeve 191d is positioned in the second shift position SP2, the first hub 191a is engaged with the second engaging member 191c, and the first input shaft 111 is connected to the tubular member 115.

The second connection mechanism 192 is a dog clutch which is converted to one of a third shift position SP3 in which the first driven gear 141 is connected to the first output shaft 121, and a second neutral N2 in which the first driven gear 141 is disconnected from the first output shaft 121. In other words, the second connection mechanism 192 connects and disconnects the first driven gear 141 and the first output shaft 121 to and from each other.

The second connection mechanism 192 is configured of a second hub 192a, a third engaging member 192b, a second sleeve 192d, and a second actuator 192e. The second hub 192a is fixed to the first output shaft 121. The third engaging member 192b is fixed to the first driven gear 141. Structures and functions of the second hub 192a, the third engaging member 192b, the second sleeve 192d, and the second actuator 192e, are respectively similar to the structures and the functions of the first hub 191a, the first engaging member 191b, the first sleeve 191d, and the first actuator 191e.

The third connection mechanism 193 is a dog clutch which is converted to one of a fourth shift position SP4 in which the second driven gear 142 is connected to the second output shaft 122, and a third neutral N3 in which the second driven gear 142 is disconnected from the second output shaft 122. In other words, the third connection mechanism 193 connects and disconnects the second driven gear 142 and the second output shaft 122 to and from each other.

The third connection mechanism 193 is configured of a third hub 193a, a fourth engaging member 193b, a third sleeve 193d, and a third actuator 193e. The third hub 193a is fixed to the second output shaft 122. The fourth engaging member 193b is fixed to the second driven gear 142. Structures and functions of the third hub 193a, the fourth engaging member 193b, the third sleeve 193d, and the third actuator 193e are respectively similar to the structures and the functions of the first hub 191a, the first engaging member 191b, the first sleeve 191d, and the first actuator 191e.

The engine rotational speed sensor 171 detects the rotational speed of the driving shaft 2a, that is, the rotational speed (engine rotational speed Neng) of the engine 2. The first motor rotational speed sensor 172 detects the rotational speed (first motor rotational speed Nmg1) of the first motor generator 11. The output shaft rotational speed sensor 173 detects the rotational speed (output shaft rotational speed NO) of the second output shaft 122. In addition, the output shaft rotational speed sensor 173 may detect the rotational speed of the first output shaft 121. The sensors 171 to 173 output the detected signals to the control portion 18. The control portion 18 calculates the rotational speed (first drive gear rotational speed Ng1) of the first drive gear 131 based on the rotational speed of the first output shaft 121 detected by the output shaft rotational speed sensor 173.

Modes of Hybrid Vehicle Driving Device

Next, by using the engagement table illustrated in FIG. 2, modes of the hybrid vehicle driving device 1 will be described.

EV-L Mode

An EV-L mode is a mode in which the vehicle V travels only by a driving force of the second motor generator 12. In a case where the EV-L mode is achieved in the automatic transmission 4, the control portion 18 outputs the command to the connection mechanisms 191 to 193 so that the shift position becomes the field of the EV-L mode of the engagement table of FIG. 2. When the EV-L mode is achieved in the automatic transmission 4, the first driven gear 141 is connected to the first output shaft 121, and the second motor generator 12 is rotatably linked to the driving wheels 21L and 21R. Then, the second motor torque Tmg2 which is output from the second motor generator 12 is transmitted to the driving wheels 21L and 21R via the first output shaft 121.

EV-H Mode

An EV-H mode is a mode in which the vehicle V travels only by the driving force of the second motor generator 12. In the EV-H mode, a reduction gear ratio between the second motor generator 12 and the driving wheels 21L and 21R is smaller than the reduction gear ratio of the EV-L mode. In a case where the EV-H mode is achieved in the automatic transmission 4, the control portion 18 outputs the command to the connection mechanisms 191 to 193 so that the shift position becomes a field of the EV-H mode of the engagement table of FIG. 2. When the EV-H mode is achieved in the automatic transmission 4, the second driven gear 142 is connected to the second output shaft 122, and the second motor generator 12 is rotatably linked to the driving wheels 21L and 21R. Then, the second motor torque Tmg2 output from the second motor generator 12 is transmitted to the driving wheels 21L and 21R via the second output shaft 122.

EV-OD Mode

An EV-OD mode is a mode in which the vehicle V travels by the driving force of the first motor generator 11. In the EV-OD mode, the reduction gear ratio between the first motor generator 11 and the driving wheels 21L and 21R is smaller than the reduction gear ratio between the second motor generator 12 and the driving wheels 21L and 21R in the EV-H mode. In a case where the EV-OD mode is achieved in the automatic transmission 4, the control portion 18 outputs the command to the connection mechanisms 191 to 193 so that the shift position becomes a field of the EV-OD mode of the engagement table of FIG. 2. When the EV-OD mode is achieved in the automatic transmission 4, the first drive gear 131 is connected to the tubular member 115, and the first motor generator 11 is rotatably linked to the driving wheels 21L and 21R. Then, the first motor torque Tmg1 output from the first motor generator 11 is transmitted to the driving wheels 21L and 21R via the second output shaft 122. In addition, the EV-OD mode is achieved while changing the speed between the EV-L mode and the EV-H mode, the first motor torque Tmg1 is output to the driving wheels 21L and 21R from the first motor generator 11, and accordingly, the deceleration of the vehicle V is prevented.

Engine Travel Mode

An engine travel mode is a mode in which the vehicle V travels by the driving force of the engine 2. In a case where the engine travel mode is achieved in the automatic transmission 4, the control portion 18 outputs the command to the connection mechanisms 191 to 193 so that the shift position becomes a field of the engine travel mode of the engagement table of FIG. 2. When the engine travel mode is achieved in the automatic transmission 4, the first drive gear 131 is connected to the tubular member 115. In addition, when the engine 2 outputs the engine torque Teng, the one-way clutch 161 is placed in a locked state, the first input shaft 111 and the tubular member 115 are connected to each other, and the engine torque Teng is transmitted to the driving wheels 21L and 21R via the second output shaft 122. In this case, the first motor generator 11 is driven by the driving force of the engine 2, and the first motor generator 11 generates and supplies the electric power to auxiliary equipment of the vehicle V. In addition, in a case where the required driving force is large, in the engine travel mode, the vehicle V travels by the driving force of both of the engine 2 and the first motor generator 11.

Series L Mode

A series L mode is a mode in which the first motor generator 11 is driven by the engine 2, the first motor generator 11 generates the electric power, and the vehicle V travels by the driving force of the second motor generator 12. In a case where the series L mode is achieved in the automatic transmission 4, the control portion 18 (series forming portion) outputs the command to the connection mechanisms 191 to 193 so that the shift position becomes a field of the series L mode of the engagement table of FIG. 2. When the series L mode is achieved in the automatic transmission 4, the first driven gear 141 is connected to the first output shaft 121, and the second motor generator 12 is rotatably linked to the driving wheels 21L and 21R. Since the engine 2 is driven and the first input shaft 111 rotates, the one-way clutch 161 is locked, the first motor generator 11 is driven by the engine 2, and the electric power is generated in the first motor generator 11. The electric power generated in the first motor generator 11 is used in driving the second motor generator 12, and the second motor torque Tmg2 output from the second motor generator 12 is transmitted to the driving wheels 21L and 21R via the first output shaft 121.

Series H Mode

A series H mode is a mode in which the first motor generator 11 is driven by the driving force of the engine 2, the first motor generator 11 generates the electric power, and the vehicle V travels by the driving force of the second motor generator 12. In the series H mode, the reduction gear ratio between the second motor generator 12 and the driving wheels 21L and 21R is smaller than the reduction gear ratio of the series L mode. In a case where the series H mode is achieved in the automatic transmission 4, the control portion 18 (series forming portion) outputs the command to the connection mechanisms 191 to 193 so that the shift position becomes a field of the series H mode of the engagement table of FIG. 2. When the series H mode is achieved in the automatic transmission 4, the second driven gear 142 is connected to the second output shaft 122, and the second motor generator 12 is rotatably linked to the driving wheels 21L and 21R. Since the engine 2 is driven and the first input shaft 111 rotates, the one-way clutch 161 is locked, the first motor generator 11 is driven by the engine 2, and the electric power is generated in the first motor generator 11. The electric power generated in the first motor generator 11 is used in driving the second motor generator 12, and the second motor torque Tmg2 output from the second motor generator 12 is transmitted to the driving wheels 21L and 21R via the second output shaft 122.

Parallel L Mode

A parallel L mode is a mode in which the vehicle V travels by the driving force of the engine 2 and the second motor generator 12. In a case where the parallel L mode is achieved in the automatic transmission 4, the control portion 18 (parallel forming portion) outputs the command to the connection mechanisms 191 to 193 so that the shift position becomes a field of the parallel L mode of the engagement table of FIG. 2. When the parallel L mode is achieved in the automatic transmission 4, the first drive gear 131 is connected to the tubular member 115, and the first motor generator 11 is rotatably linked to the driving wheels 21L and 21R. In addition, the first driven gear 141 is connected to the first output shaft 121. Since the engine 2 is driven and the first input shaft 111 rotates, the one-way clutch 161 is locked, and the engine torque Teng output from the engine 2 is transmitted to the first motor generator 11 and the driving wheels 21L and 21R. The electric power generated in the first motor generator 11 is used in driving the second motor generator 12. The second motor torque Tmg2 output from the second motor generator 12 is transmitted to the driving wheels 21L and 21R via the first output shaft 121. In addition, according to the case, the first motor generator 11 operates as an electric motor, and the first motor torque Tmg1 output from the first motor generator 11 is transmitted to the driving wheels 21L and 21R via the second output shaft 122.

Parallel H Mode

A parallel H mode is a mode in which the vehicle V travels by the driving force of the engine 2 and the second motor generator 12. In the parallel H mode, the reduction gear ratio between the second motor generator 12 and the driving wheels 21L and 21R is smaller than the reduction gear ratio of the parallel L mode. In a case where the parallel H mode is achieved in the automatic transmission 4, the control portion 18 (parallel forming portion) outputs the command to the connection mechanisms 191 to 193 so that the shift position becomes a field of the parallel H mode of the engagement table of FIG. 2. When the parallel H mode is achieved in the automatic transmission 4, the first drive gear 131 is connected to the tubular member 115, and the first motor generator 11 is rotatably linked to the driving wheels 21L and 21R. In addition, the second driven gear 142 is connected to the second output shaft 122. Since the engine 2 is driven and the first input shaft 111 rotates, the one-way clutch 161 is locked, and the engine torque Teng output from the engine 2 is transmitted to the first motor generator 11 and the driving wheels 21L and 21R. The electric power generated in the first motor generator 11 is used in driving the second motor generator 12, and the second motor torque Tmg2 output from the second motor generator 12 is transmitted to the driving wheels 21L and 21R via the second output shaft 122. In addition, according to the case, the first motor generator 11 operates as an electric motor, and the first motor torque Tmg1 output from the first motor generator 11 is transmitted to the driving wheels 21L and 21R via the second output shaft 122.

Engine Start Mode

An engine start mode is a mode in which the engine 2 is started by the first motor generator 11. In a case where the engine start mode is achieved in the automatic transmission 4, the control portion 18 outputs the command to the connection mechanisms 191 to 193 so that the shift position becomes a field of the engine start mode of the engagement table of FIG. 2. In other words, the control portion 18 allows the first connection mechanism 191 to be in the second shift position SP2. In addition, the control portion 18 allows the second connection mechanism 192 and the third connection mechanism 193 to be in a shift position which corresponds to a traveling state of the vehicle V. When the engine start mode is achieved in the automatic transmission 4, the rotor 11a of the first motor generator 11 is connected to the first input shaft 111. The first motor torque Tmg1 output from the first motor generator 11 is transmitted to the engine 2, and the engine 2 is started.

Outline of Engine Connection Control

Hereinafter, by using a time chart illustrated in FIG. 3, an outline of the engine connection control will be described. In the embodiment, in a case where the engine 2 is connected to the driving wheels 21L and 21R, that is, in a case where any of the EV-L mode, the EV-H mode, the series L mode, and the series H mode is changed to any of the engine travel mode, a parallel L mode, and a parallel H mode, the "engine connection control" which will be described later is executed, and the driving shaft 2a of the engine 2 is connected to the second output shaft 122.

In a case where the engine 2 is not started, when the "engine connection control" is started, the first input shaft 111 and the tubular member 115 are connected to each other by the first connection mechanism 191, and the rotor 11a of the first motor generator 11 and the driving shaft 2a of the engine 2 are connected to each other (T1 of FIG. 3). In addition, the engine 2 is started by the first motor generator 11 (T2 of FIG. 3).

Next, the first motor generator 11 is controlled so that the first motor rotational speed Nmg1 is synchronized with the first drive gear rotational speed Ng1 (T3 to T4 of FIG. 3). At this time, the engine rotational speed Neng is maintained to be the rotational speed lower than the first motor rotational speed Nmg1 (T3 to T4 of FIG. 3).

Next, when the first motor rotational speed Nmg1 is synchronized with the first drive gear rotational speed Ng1, by the first connection mechanism 191, the first drive gear 131 is connected to the tubular member 115, and the rotor 11a of the first motor generator 11 is connected to the first drive gear 131 (T4 of FIG. 3).

Next, the engine 2 is controlled so that the engine rotational speed Neng is synchronized with the first drive gear rotational speed Ng1 (T5 to T6 of FIG. 3). In addition, when the engine rotational speed Neng is synchronized with the first drive gear rotational speed Ng1, the one-way clutch 161 is locked, the first input shaft 111 and the tubular member 115 are connected to each other, the driving shaft 2a of the engine 2 is connected to the first drive gear 131, and the driving shaft 2a of the engine 2 is connected to the second output shaft 122. Then, the engine torque Teng is transmitted to the driving wheels 21L and 21R via the second output shaft 122.

In this manner, as illustrated by T3 to T4 of FIG. 3, in a state where the engine rotational speed Neng is maintained to be the rotational speed lower than the first motor rotational speed Nmg1, by the first connection mechanism 191, the rotor 11a of the first motor generator 11 is connected to the first drive gear 131. Accordingly, since the inertial force of the engine 2 is not input to the first connection mechanism 191 or the first drive gear 131, an excessive force does not act on the first connection mechanism 191, the first drive gear 131, and the member on the driving wheels 21L and 21R rather than the first drive gear 131.

In addition, when the engine rotational speed Neng is synchronized with the first drive gear rotational speed Ng1, by the one-way clutch 161, the first input shaft 111 and the tubular member 115 are connected to each other, and the driving shaft 2a of the engine 2 is connected to the first drive gear 131. In other words, in a state where there is no difference in the rotational speed between the first input shaft 111 and the tubular member 115, the first input shaft 111 and the tubular member 115 are connected to each other. Therefore, a force caused by the inertial force of the engine 2 is not input to the first hub 191a, the first sleeve 191d, the first engaging member 191b, the first drive gear 131, and the overdrive driven gear 149 which are the members on the driving wheels 21L and 21R rather than the tubular member 115 (connection member), and an excessive force does not act on the above-described members.

Engine Connection Control

Figure 4:
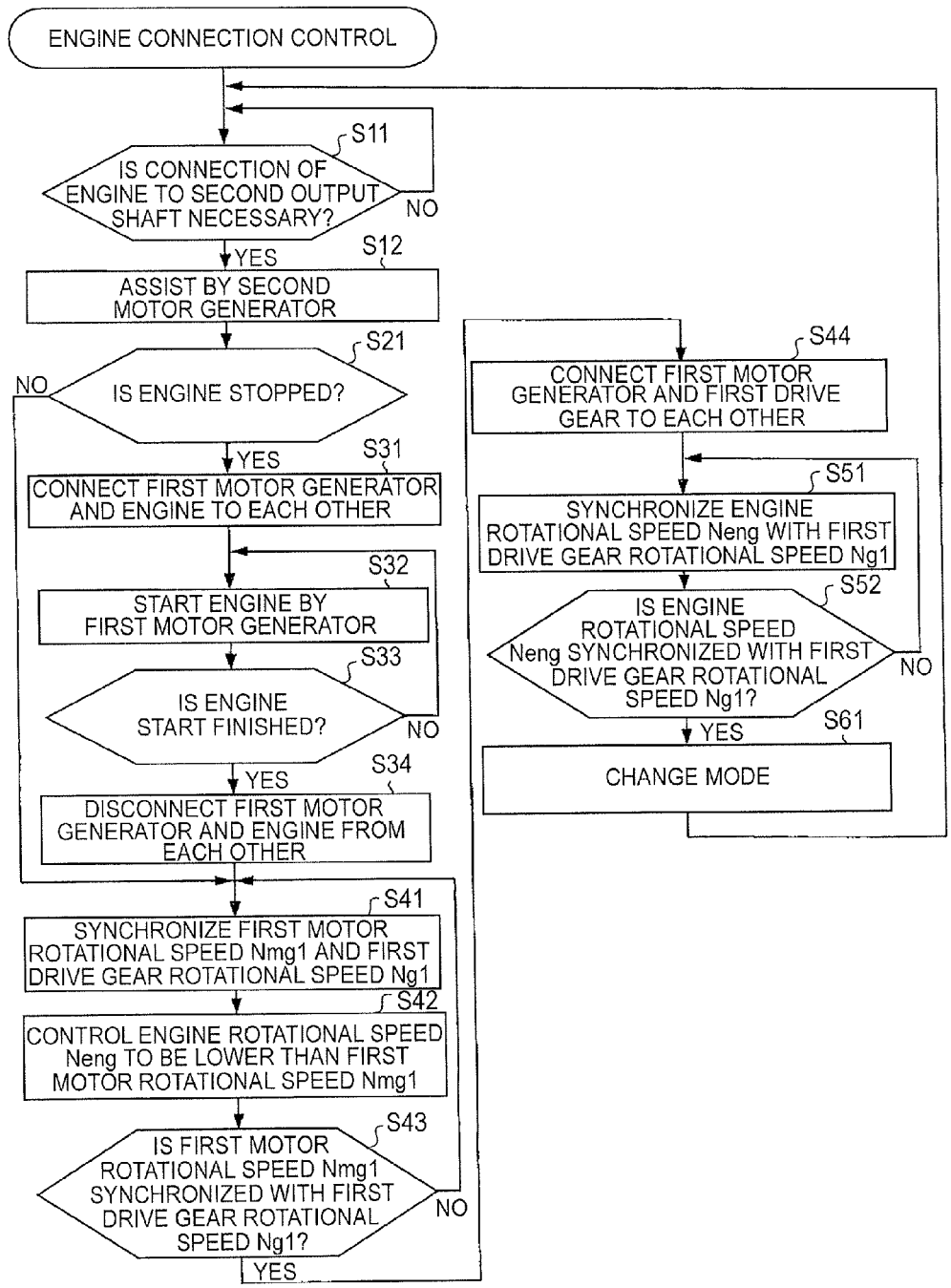
FIG. 4 is a flowchart of the engine connection control.

Hereinafter, the "engine connection control" will be described by using a flowchart illustrated in FIG. 4.

When ignition of the vehicle V is turned ON, a program proceeds to step S11.

In step S11, in a case where it is determined that the connection of the engine 2 to the second output shaft 122 is necessary (step S11: YES), the control portion 18 allows the program to proceed to step S12. Meanwhile, in a case where it is determined that the connection of the engine 2 to the second output shaft 122 is not necessary (step S11: NO), the control portion 18 allows the program to repeat the processing of step S11. In addition, in a case where it is determined that it is necessary to change the mode from any of the EV-L mode, the EV-H mode, the series L mode, and the series H mode, to any of the engine travel mode, the parallel L mode, and the parallel H mode, the control portion 18 determines that the connection of the engine 2 to the second output shaft 122 is necessary.

In step S12, the control portion 18 (driving force assist portion) outputs the command to the inverter device 16 so that the torque output by the hybrid vehicle driving device 1 becomes the required torque Trd, by the second motor torque Tmg2 output by the second motor generator 12. Accordingly, the driving wheels 21L and 21R are driven (assisted) by the second motor torque Tmg2 output by the second motor generator 12.

In step S21, in a case where it is determined that the mode of the hybrid vehicle driving device 1 is the EV-L mode or the EV-H mode and the engine 2 is stopped (step S21: YES), the control portion 18 allows the program to proceed to step S31. Meanwhile, in a case where it is determined that the mode of the hybrid vehicle driving device 1 is the series L mode or the series H mode and the engine 2 is not stopped (step S21: NO), the control portion 18 allows the program to proceed to step S41.

In step S31, the control portion 18 outputs the command to the first connection mechanism 191, connects the tubular member 115 and the first input shaft 111 to each other, and connects the rotor 11a of the first motor generator 11 and the driving shaft 2a of the engine 2 to each other.

In step S32, the control portion 18 outputs the command to the inverter device 16 and the engine 2, and rotates the driving shaft 2a of the engine 2 by the first motor generator 11, and the engine 2 is started.

In step S33, in a case where it is determined that the start of the engine 2 is completed based on the detection result from the engine rotational speed sensor 171 (step S33: YES), the control portion 18 allows the program to proceed to step S34. Meanwhile, in a case where it is determined that the start of the engine 2 is not completed (step S33: NO), the control portion 18 allows the program to return to step S32.

In step S34, the control portion 18 outputs the command to the first connection mechanism 191, disconnects the tubular member 115 and the first input shaft 111 from each other, and disconnects the rotor 11a of the first motor generator 11 and the driving shaft 2a of the engine 2 from each other (T3 of FIG. 3).

In step S41, the control portion 18 (synchronization control portion) outputs the command to the inverter device 16 and controls the first motor generator 11 so that the first motor rotational speed Nmg1 is synchronized with the first drive gear rotational speed Ng1 based on the detection result from the output shaft rotational speed sensor 173 and the first motor rotational speed sensor 172 (T3 to T4 of FIG. 3).

In step S42, the control portion 18 (first engine control portion) outputs the command to the engine 2 based on the detection result from the engine rotational speed sensor 171 and the first motor rotational speed sensor 172, and controls the engine 2 so that the engine rotational speed Neng becomes lower than the first motor rotational speed Nmg1 (T3 to T4 of FIG. 3). Accordingly, the one-way clutch 161 is placed in a free state.

In step S43, in a case where it is determined that the first motor rotational speed Nmg1 is synchronized with the first drive gear rotational speed Ng1 (step S43: YES), based on the detection result from the output shaft rotational speed sensor 173 and the first motor rotational speed sensor 172, the control portion 18 allows the program to proceed to step S44. Meanwhile, in a case where it is determined that the first motor rotational speed Nmg1 is not synchronized with the first drive gear rotational speed Ng1 (step S43: NO), the control portion 18 allows the program to return to step S41.

In step S44, the control portion 18 (connection portion) outputs the command to the first connection mechanism 191, connects the tubular member 115 and the first drive gear 131 to each other, and connects the rotor 11a of the first motor generator 11 and the first drive gear 131 to each other (T4 of FIG. 3). In addition, the control portion 18 outputs the command to the inverter device 16, and stops the driving of the first motor generator 11.

In step S51, the control portion 18 (second engine control portion) controls the engine 2 (T5 to T6 of FIG. 3) so that the engine rotational speed Neng is synchronized with the first drive gear rotational speed Ng1, that is, so that the rotational speed of the first input shaft 111 is synchronized with the rotational speed of the tubular member 115 (connection member), based on the detection result from the engine rotational speed sensor 171 and the output shaft rotational speed sensor 173.

In step S52, in a case where it is determined that the engine rotational speed Neng is synchronized with the first drive gear rotational speed Ng1 (step S52: YES, T6 of FIG. 3) based on the detection result from the engine rotational speed sensor 171 and the output shaft rotational speed sensor 173, the control portion 18 allows the program to proceed to step S61. Meanwhile, in a case where it is determined that the engine rotational speed Neng is not synchronized with the first drive gear rotational speed Ng1 (step S52: NO), the control portion 18 allows the program to return to step S51. In addition, when the engine rotational speed Neng is synchronized with the first drive gear rotational speed Ng1, the rotational speed of the first input shaft 111 is synchronized with the rotational speed of the tubular member 115 (connection member), the one-way clutch 161 is locked, the first input shaft 111 and the tubular member 115 are connected to each other, and the driving shaft 2a of the engine 2 is connected to the second output shaft 122.

In step S61, the control portion 18 changes the mode to any of the above-described engine travel mode, the parallel L mode, and the parallel H mode so that the torque output by the hybrid vehicle driving device 1 becomes the required torque Trd, and controls the engine 2, the first motor generator 11, and the second motor generator 12. In the example illustrated in FIG. 3, the driving (assist) of the driving wheels 21L and 21R is stopped by the second motor torque Tmg2 output from the second motor generator 12. When step S61 is finished, the control portion 18 allows the program to return to step S11.

Effects of Embodiment

As can be apparent from the above-described description, in a state where the engine rotational speed Neng is maintained to be the rotational speed lower than the first motor rotational speed Nmg1 by the control portion 18 (first engine control portion) (T3 to T4 of FIG. 3), by the first connection mechanism 191, the tubular member 115 (connection member) and the first drive gear 131 (rotating member) are connected to each other (T4 of FIG. 3), and the rotor 11a of the first motor generator 11 is connected to the first drive gear 131 (rotating member). Accordingly, when the first motor generator 11 is connected to the first drive gear 131 (rotating member), the inertial force of the engine 2 is not input to the first connection mechanism 191 or the first drive gear 131 (rotating member). Therefore, an excessive force does not act on the first hub 191a, the first engaging member 191b, and the first sleeve 191d which configure the first connection mechanism 191, or the member on the driving wheels 21L and 21R rather than the first drive gear 131 (rotating member), and an excessive force does not act on the member, such as the gear which changes the speed of the hybrid vehicle driving device 1.

In addition, the engine 2 is controlled by the control portion 18 (second engine control portion) so that the rotational speed of the first input shaft 111 is synchronized with the rotational speed of the tubular member 115 (connection member). In addition, when the rotational speed of the first input shaft 111 is synchronized with the rotational speed of the tubular member 115 (connection member) (T6 of FIG. 3), by the one-way clutch 161, the first input shaft 111 and the tubular member 115 (connection member) are connected to each other, and the driving shaft 2a of the engine 2 is connected to the first drive gear 131 (rotating member) via the one-way clutch 161, the tubular member 115 (rotating member), and the first connection mechanism 191, and is connected to the second output shaft 122. In other words, in a state where there is no difference in the rotational speed between the first input shaft 111 and the tubular member 115 (connection member), and the first input shaft 111 and the tubular member 115 (connection member) are connected to each other via the one-way clutch 161. Therefore, when the engine 2 is connected to the second output shaft 122, since the inertial force of the engine 2 is not input to the tubular member 115 (connection member), an excessive force does not act on the first hub 191a, the first sleeve 191d, the first engaging member 191b, the first drive gear 131, and the overdrive driven gear 149 which are the members on the driving wheels 21L and 21R rather than the tubular member 115 (connection member), and the excessive force does not act on the member, such as the gear that changes the speed of the hybrid vehicle driving device 1.

In addition, since the first motor generator 11 has excellent responsiveness, during a short period of time, the first motor rotational speed Nmg1 is synchronized with the first drive gear rotational speed Ng1, and it is possible to connect the rotor 11a of the first motor generator 11 to the first drive gear 131 by the first connection mechanism 191. In addition, after the rotor 11a of the first motor generator 11 is connected to the first drive gear 131, as the engine 2 is controlled so that the rotational speed of the first input shaft 111 is synchronized with the rotational speed of the tubular member 115 (connection member), the one-way clutch 161 is locked, and the driving shaft 2a of the engine 2 is connected to the second output shaft 122. Accordingly, by the connection and disconnection of the clutch, compared to a configuration in which the driving shaft 2a of the engine 2 is connected to the second output shaft 122, during a short period of time, the engine 2 is connected to the second output shaft 122. As a result, during a short period of time, a change in the mode of the hybrid vehicle driving device 1 is finished, and the driver does not feel discomfort.

In executing the "engine connection control", the control portion 18 (driving force assist portion) drives the driving wheels 21L and 21R by the second motor generator 12 (T1 to T6 of FIG. 3). Therefore, in executing the "engine connection control", the deceleration of the vehicle V is suppressed, and the driver does not feel discomfort.

According to the above-described configuration, in order to achieve the above-described effects, the one-way clutch 161 may be placed in a locked state in a case where the rotational speed of the first input shaft 111 linked to the driving shaft 2a of the engine 2 is higher than the rotational speed of the rotor 11a of the first motor generator 11, the first input shaft 111 and the tubular member 115 may be connected to each other, and the first driving shaft 2a may be rotatably linked to the rotor 12a.

In addition, the one-way clutch 161 is placed in a free state in a case where the rotational speed of the first input shaft 111 is lower than the rotational speed of the tubular member 115, and the first input shaft 111 and the tubular member 115 may be disconnected from each other.

Furthermore, the first drive gear 131 may be provided to be turnable around a shaft line of the tubular member 115.

Other Embodiments

In the above-described embodiment, the first connection mechanism 191 to the third connection mechanism 193 are dog clutches. However, the first connection mechanism 191 to the third connection mechanism 193 may be a synchronizer mechanism. In addition, the second connection mechanism 192 and the third connection mechanism 193 can be operated by the same actuator.

In the above-described embodiment, the control portion 18 calculates the first drive gear rotational speed Ng1 based on the output shaft rotational speed No detected by the output shaft rotational speed sensor 173. However, an embodiment in which the first drive gear rotational speed Ng1 is obtained by a sensor that detects the rotational speed of the first drive gear 131, may be employed. Otherwise, based on the detection result from the sensor which detects the rotational speed of a member interlocked with the first drive gear 131, an embodiment in which the control portion 18 calculates the first drive gear rotational speed Ng1, may be employed.

A hybrid vehicle driving device according to an aspect of this disclosure includes: a first motor generator; a second motor generator; an input shaft to which an engine is rotatably linked; an output shaft to which a driving wheel and the second motor generator are rotatably linked; a rotating member which is rotatably linked to the output shaft; a connection member to which the first motor generator is connected; a connection mechanism which connects and disconnects the connection member and the rotating member to and from each other; a one-way clutch which connects the input shaft and the connection member to each other in a case where the rotational speed of the input shaft is higher than the rotational speed of the connection member, and disconnects the input shaft and the connection member from each other in a case where the rotational speed of the input shaft is lower than the rotational speed of the connection member; a synchronization control portion which synchronizes the rotational speed of the first motor generator with the rotational speed of the rotating member in the middle of executing the engine connection control that connects the engine to the rotating member by the one-way clutch after connecting the connection member and the rotating member to each other by the connection mechanism; a first engine control portion which maintains the rotational speed of the engine to be a rotational speed lower than the rotational speed of the first motor generator while synchronizing the rotational speed of the first motor generator with the rotational speed of the rotating member by the synchronization control portion in the middle of executing the engine connection control; a connection portion which connects the connection member and the rotating member to each other by the connection mechanism after synchronizing the rotational speed of the first motor generator with the rotational speed of the rotating member by the synchronization control portion in the middle of executing the engine connection control; and a second engine control portion which controls the engine such that the rotational speed of the input shaft is synchronized with the rotational speed of the connection member after connecting the connection member and the rotating member to each other by the connection portion in the middle of executing the engine connection control.

In this manner, in a state where the rotational speed of the engine is maintained to be the rotational speed lower than the rotational speed of the first motor generator by the first engine control portion, and by the connection mechanism, the connection member and the rotating member are connected to each other, and the first motor generator is connected to the rotating member. Accordingly, when the first motor generator is connected to the rotating member, the inertial force of the engine is not input to the connection mechanism or the rotating member. Therefore, an excessive force does not act on a member on the driving wheel rather than the connection mechanism and the rotating member which configure the hybrid vehicle driving device, and an excessive force does not act on a member, such as a gear that changes the speed of the hybrid vehicle driving device.

In addition, the engine is controlled by the second engine control portion so that the rotational speed of the input shaft is synchronized with the rotational speed of the connection member. In addition, when the rotational speed of the input shaft is synchronized with the rotational speed of the connection member, the input shaft and the connection member are connected to each other by the one-way clutch, the engine is connected to the rotating member via the one-way clutch and the connection member, and the engine is connected to the output shaft. In other words, in a state where there is no difference in rotational speed between the input shaft and the connection member, the input shaft and the connection member are connected to each other via the one-way clutch. Therefore, when the engine is connected to the output shaft, since the inertial force of the engine is not input to the connection member, an excessive force does not act on a member which configures the hybrid vehicle driving device and an excessive force does not act on a member, such as a gear which changes the speed of the hybrid vehicle driving device.

The hybrid vehicle driving device according to the aspect of this disclosure may be configured to further include: a driving force assist portion which drives the driving wheel by the second motor generator in the middle of executing the engine connection control.

The hybrid vehicle driving device according to the aspect of this disclosure may be configured such that the one-way clutch is placed in a locked state in a case where the rotational speed of the input shaft linked to a driving shaft of the engine is higher than the rotational speed of a rotor of the first motor generator, the input shaft and the tubular connection member are connected to each other, and the driving shaft is rotatably linked to the rotor.

The hybrid vehicle driving device according to the aspect of this disclosure may be configured such that the one-way clutch is placed in a free state in a case where the rotational speed of the input shaft is lower than the rotational speed of the tubular connection member, and the input shaft and the connection member are disconnected from each other.

The hybrid vehicle driving device according to the aspect of this disclosure may be configured such that the rotating member is provided to be turnable around a shaft line of the tubular connection member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hybrid vehicle driving device comprising:
a first motor generator;
a second motor generator;
an input shaft to which an engine is rotatably linked;
an output shaft to which a driving wheel and the second motor generator are rotatably linked;
a rotating member which is rotatably linked to the output shaft;
a connection member to which the first motor generator is connected;
a connection mechanism which connects and disconnects the connection member and the rotating member to and from each other;
a one-way clutch which connects the input shaft and the connection member to each other in a case where the rotational speed of the input shaft is higher than the rotational speed of the connection member, and disconnects the input shaft and the connection member from each other in a case where the rotational speed of the input shaft is lower than the rotational speed of the connection member;
a synchronization control portion which synchronizes the rotational speed of the first motor generator with the rotational speed of the rotating member in the middle of executing an engine connection control that connects the engine to the rotating member by the one-way clutch after connecting the connection member and the rotating member to each other by the connection mechanism;
a first engine control portion which maintains the rotational speed of the engine to be a rotational speed lower than the rotational speed of the first motor generator while synchronizing the rotational speed of the first motor generator with the rotational speed of the rotating member by the synchronization control portion in the middle of executing the engine connection control;
a connection portion which connects the connection member and the rotating member to each other by the connection mechanism after synchronizing the rotational speed of the first motor generator with the rotational speed of the rotating member by the synchronization control portion in the middle of executing the engine connection control; and
a second engine control portion which controls the engine such that the rotational speed of the input shaft is synchronized with the rotational speed of the connection member after connecting the connection member and the rotating member to each other by the connection portion in the middle of executing the engine connection control.

2. The hybrid vehicle driving device according to claim 1, further comprising:
a driving force assist portion which drives the driving wheel by the second motor generator in the middle of executing the engine connection control.

3. The hybrid vehicle driving device according to claim 1, wherein the one-way clutch is placed in a locked state in a case where the rotational speed of the input shaft linked to a driving shaft of the engine is higher than the rotational speed of a rotor of the first motor generator, the input shaft and the connection member are connected to each other, and the driving shaft is rotatably linked to the rotor.

4. The hybrid vehicle driving device according to claim 1, wherein the one-way clutch is placed in a free state in a case where the rotational speed of the input shaft is lower than the rotational speed of the connection member, and the input shaft and the connection member are disconnected from each other.

5. The hybrid vehicle driving device according to claim 1, wherein the rotating member is provided to be turnable around a shaft line of the connection member.

* * * * *